US012602939B2

(12) United States Patent
Kawai et al.

(10) Patent No.: US 12,602,939 B2
(45) Date of Patent: Apr. 14, 2026

(54) INSPECTION SYSTEM AND INSPECTION METHOD

(71) Applicant: DAIKIN INDUSTRIES, LTD., Osaka (JP)

(72) Inventors: Shogo Kawai, Osaka (JP); Naomi Yoshimura, Osaka (JP); Aoi Goto, Osaka (JP); Wakana Takano, Osaka (JP); Ryuichiro Oto, Osaka (JP); Shotaro Maeda, Osaka (JP); Mirei Kanetake, Osaka (JP); Takashi Namikawa, Osaka (JP); Shiho Watanabe, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 59 days.

(21) Appl. No.: 18/549,657

(22) PCT Filed: Mar. 18, 2022

(86) PCT No.: PCT/JP2022/012761
§ 371 (c)(1),
(2) Date: Sep. 8, 2023

(87) PCT Pub. No.: WO2022/202694
PCT Pub. Date: Sep. 29, 2022

(65) Prior Publication Data
US 2024/0169749 A1 May 23, 2024

(30) Foreign Application Priority Data

Mar. 22, 2021  (JP) ................................. 2021-047960
Sep. 30, 2021  (JP) ................................. 2021-161942

(51) Int. Cl.
*G06V 20/69* (2022.01)
*G01N 1/38* (2006.01)
*G06V 10/70* (2022.01)

(52) U.S. Cl.
CPC ............. *G06V 20/693* (2022.01); *G01N 1/38* (2013.01); *G06V 10/70* (2022.01); *G06V 20/698* (2022.01)

(58) Field of Classification Search
CPC .... G06V 20/693; G06V 20/698; G06V 10/70; G01N 1/38
See application file for complete search history.

(56) References Cited

U.S. PATENT DOCUMENTS 10,769,501 B1    9/2020  Ando et al.
2003/0170613 A1  9/2003  Straus
(Continued)

FOREIGN PATENT DOCUMENTS

CN    108520206    9/2018
ES    2126513      3/1999
(Continued)

OTHER PUBLICATIONS

International Preliminary Report on Patentability for PCT/JP2022/012761 mailed on Oct. 5, 2023.
(Continued)

*Primary Examiner* — Girumsew Wendmagegn
(74) *Attorney, Agent, or Firm* — IPUSA, PLLC

(57) ABSTRACT

An sure, an inspection system and an inspection method that reduce the time required to inspect environmental microorganisms, are provided. The inspection system inspection system is for inspecting a microorganism or mold that is generated in an indoor environment or a device, and the inspection system includes an imaging unit configured to directly capture a sample collected from the indoor envi-
(Continued)

ronment or the device; and an output unit configured to inspect the microorganism or the mold in image data captured by the imaging unit, and output an inspection result.

22 Claims, 12 Drawing Sheets

(56) References Cited

U.S. PATENT DOCUMENTS

| | | | |
|---|---|---|---|
| 2014/0287455 A1* | 9/2014 | Irie | C12Q 1/04 |
| | | | 435/38 |
| 2016/0290912 A1* | 10/2016 | Kent | G01N 35/00871 |
| 2020/0158603 A1 | 5/2020 | Scialo et al. | |
| 2020/0340901 A1 | 10/2020 | Ozcan et al. | |
| 2021/0292805 A1 | 9/2021 | Pastore et al. | |
| 2023/0377354 A1* | 11/2023 | Rohani | G06V 20/693 |
| 2024/0169749 A1 | 5/2024 | Kawai et al. | |

FOREIGN PATENT DOCUMENTS

| | | |
|---|---|---|
| JP | 2000-258416 | 9/2000 |
| JP | 2007-195454 | 8/2007 |
| JP | 2020-529869 | 10/2020 |
| JP | 2022-146910 | 10/2022 |
| WO | 2019/030261 | 2/2019 |
| WO | 2019/074926 | 4/2019 |
| WO | 2019/204854 | 10/2019 |

OTHER PUBLICATIONS

International Search Report for PCT/JP2022/012761 mailed on Jun. 14, 2022.

King, M.D. et al. Assays and enumeration of bioaerosols-traditional approaches to modern practices Aerosol Science and Technology Feb. 24, 2020 vol. 54 pp. 611-633 doi:10.1080/02786826.2020.1723789.

Khan, A. A. H. and Karuppayil, S. M. Fungal pollution of indoor environments and its management Saudi Journal of Biological Sciences Jun. 15, 2012 vol. 19 pp. 405-426 doi:10.1016/j.sjbs.2012.06.002.

Teruya Maki et al.,Epifluorescent Microscopic Observation of Aerosol, Aerosol research, Oct. 1, 2023, vol. 28, No. 3 pp. 201-207 doi:10.11203/jar.28.201 with English concise explanation.

Cao, N et al. Dataset: Pollen Video Library for Benchmarking Detection, Classification, Tracking and Novelty Detection Tasks DATA '20: Proceedings of the Third Workshop on Data: Acquisition To Analysis, Nov. 16, 2020, pp. 23-25 doi:10.1145/3419016.3431487.

Ananymos, "InstaLab—The World's First Mold Recognition AlSoftware", Bust Mold Inc., Oct. 25, 2020. Retrieved from the Internet <https://www.bustmold.com/resources/machine-learning/>.

Extended European search report mailed on Mar. 20, 2025 with respect to the corresponding EP patent application No. 22775481.9.

Wu Yichen et al.: "Label-Free Bioaerosol Sensing Using Mobile Microscopy and Deep Learning", ACS Photonics, vol. 5, No. 11, Oct. 4, 2018 (Oct. 4, 2018), pp. 4617-4627, XP093253556, ISSN: 2330-4022.

* cited by examiner

120

MOBILE TERMINAL

301 PROCESSOR

302 MEMORY

303 AUXILIARY STORAGE DEVICE

307

304 DISPLAY DEVICE

305 OPERATION DEVICE

306 COMMUNICATION DEVICE

121 IMAGING DEVICE

3a

140

IMAGE PROCESSING APPARATUS

321 PROCESSOR

322 MEMORY

323 AUXILIARY STORAGE DEVICE

328

324 DISPLAY DEVICE

325 OPERATION DEVICE

326 COMMUNICATION DEVICE

327 DRIVE DEVICE

329 RECORDING MEDIUM

3b

710

7a

720

| AGGREGATED DATA | |
| --- | --- |
| TYPE OF MOLD | NUMBER OF INDIVIDUAL MOLD UNITS |
| MOLD A | Na |
| MOLD B | Nb |
| MOLD C | Nc |
| MOLD D | Nd |
| MOLD E | Ne |
| MOLD F | Nf |
| OTHER | N |

7b

START
INSPECTION PROCESSING

S901

COLLECT DUST

S902

DISSOLVE

S903

CAPTURE IMAGING TARGET

S904

DETERMINE POSITION AND ATTRIBUTE OF EACH REGION
IN IMAGE DATA AND EXTRACT PARTIAL IMAGE

S905

DETERMINE TYPE OF ENVIRONMENTAL
MICROORGANISM FOR EACH PARTIAL IMAGE

S906

VISUALIZATION PROCESSING

END
INSPECTION PROCESSING

INSPECTION SYSTEM AND INSPECTION METHOD

TECHNICAL FIELD

The present disclosure relates to an inspection system and inspection method.

BACKGROUND ART

Conventionally, a service has been provided to inspect the presence or absence of and the type of environmental microorganisms (for example, mold) included in dust, etc., in air conditioners, and to provide the inspection results. By providing such a service, the service provider can make proposals (for example, cleaning air conditioners and changing filters of air conditioners, etc.) to realize an optimal air environment according to the inspection results.

CITATION LIST

Patent Documents (Patent document 1) Japanese Unexamined Patent Application Publication No. 2007-195454
(Patent document 2) Japanese Translation of PCT International Application Publication No. 2020-529869
(Patent document 3) WO 2019/074926

SUMMARY OF INVENTION

Technical Problem

However, in order to inspect the presence or absence of and the type of environmental microorganisms, a culture method in which collected samples (such as dust including environmental microorganisms) are cultured in a culture medium has been used, which has taken time to provide the inspection results.

The present disclosure provides an inspection system and inspection method that reduce the time required to inspect environmental microorganisms.

Solution to Problem

The first aspect of the present disclosure is an inspection system for inspecting a microorganism or mold that is generated in an indoor environment or a device, the inspection system including an imaging unit configured to directly capture a sample collected from the indoor environment or the device; and an output unit configured to inspect the microorganism or the mold in image data captured by the imaging unit, and output an inspection result.

According to the first aspect of the present disclosure, an inspection system that reduces the time required to inspect environmental microorganisms can be provided.

Further, the second aspect of the present disclosure is an inspection system for inspecting a microorganism or mold that is generated in an indoor environment or a device, the inspection system including an imaging unit configured to capture an appearance of an individual unit of the microorganism or the mold collected from the indoor environment or the device; and an output unit configured to inspect the microorganism or the mold in image data captured by the imaging unit, and output an inspection result.

According to the second aspect of the present disclosure, an inspection system that reduces the time required to inspect environmental microorganisms can be provided.

Further, the third aspect of the present disclosure is the inspection system according to the first or second aspect, wherein an imaging target captured by the imaging unit is a solution collected from the indoor environment or the device, and the imaging unit captures the imaging target through a lens under visible light or ultraviolet light.

Further, the fourth aspect of the present disclosure is the inspection system according to the third aspect, wherein the solution can be obtained by dissolving, in the solution, the sample collected from the indoor environment or the device.

Further, the fifth aspect of the present disclosure is the inspection system according to the third aspect, wherein the imaging target is collected from any of an air conditioner, an air cleaner, a humidifier, a ventilation system, a blower, or a surface of the indoor environment.

Further, the sixth aspect of the present disclosure is the inspection system according to the third aspect, further including a first model that has completed learning configured to determine an attribute of each region in the image data.

Further, the seventh aspect of the present disclosure is the inspection system according to the sixth aspect, further including a second model that has completed learning configured to determine a type of the microorganism or the mold, with respect to the region determined to include the microorganism or the mold by the first model that has completed learning.

Further, the eighth aspect of the present disclosure is the inspection system according to any one of the first to seventh aspects, wherein the output unit aggregates a number of the microorganism or the mold for each type of the microorganism or the mold in the image data captured by the imaging unit, and outputs the aggregated number.

Further, the ninth aspect of the present disclosure is an inspection system for inspecting a microorganism or mold that is generated in an indoor environment or a device, the inspection system including an imaging unit configured to directly capture a sample collected from the indoor environment or the device; and an output unit configured to inspect the microorganism or the mold in image data captured by the imaging unit, and output an inspection result, wherein the output unit displays, as the inspection result, a type of the microorganism or the mold, a ratio of the microorganism or the mold, and the image data captured by the imaging unit, and also displays any one of information indicating the indoor environment or the device, a description of the microorganism or the mold, a level of contamination, and a result of comparison with another inspection result.

Further, the tenth aspect of the present disclosure is an inspection system for inspecting a microorganism or mold that is generated in an indoor environment or a device, the inspection system including an imaging unit configured to capture an appearance of an individual unit of the microorganism or the mold collected from the indoor environment or the device; and an output unit configured to inspect the microorganism or the mold in image data captured by the imaging unit, and output an inspection result, wherein the output unit displays, as the inspection result, a type of the microorganism or the mold, a ratio of the microorganism or the mold, and the image data captured by the imaging unit, and also displays any one of information indicating the indoor environment or the device, a description of the microorganism or the mold, a level of contamination, and a result of comparison with another inspection result.

Further, the eleventh aspect of the present disclosure is the inspection system according to any one of the third to seventh aspects, wherein the imaging target is obtained by dispersing and dissolving the collected sample in the solution.

Further, the twelfth aspect of the present disclosure is the inspection system according to the eleventh aspect, wherein the imaging target is obtained by dispersing and dissolving, in the solution, the sample collected from an air conditioner.

Further, the thirteenth aspect of the present disclosure is the inspection system according to the eleventh or twelfth aspect, wherein the imaging target is obtained by dispersing and dissolving the collected sample in a saline solution in which a surfactant is dissolved.

Further, the fourteenth aspect of the present disclosure is the inspection system according to any one of the eleventh to thirteenth aspects, wherein the imaging target includes a first solution obtained by dispersing and dissolving the collected sample in a saline solution in which a surfactant is dissolved, and a second solution obtained by further diluting the first solution by using a saline solution in which a surfactant is dissolved.

Further, the fifteenth aspect of the present disclosure is the inspection system according to the seventh aspect, wherein each of the regions, for which the attribute is determined by the first model that has completed learning, is 32 pixels×32 pixels or more.

Further, the sixteenth aspect of the present disclosure is the inspection system according to the seventh aspect, wherein the first model that has completed learning is generated by performing learning processing by using learning data, wherein in the learning data, the image data including a same type of the microorganism or the mold, and position information in which a position of each of the regions determined to include the microorganism or the mold in the image data is identified by a plurality of coordinates, are associated with each other.

Further, the seventeenth aspect of the present disclosure is the inspection system according to the seventh aspect, wherein when the type of the microorganism or the mold is determined, the second model that has completed learning counts a number of the microorganism or the mold for each determined type.

Further, the eighteenth aspect of the present disclosure is the inspection system according to any one of the first to seventeenth aspects, wherein the inspection system is a mobile terminal, and the imaging unit is built in the mobile terminal.

Further, the nineteenth aspect of the present disclosure is the inspection system according to the seventh aspect, further including a portable imaging table on which the imaging target is mounted, and a mobile terminal connected to the imaging table, wherein the imaging table includes the imaging unit, and the mobile terminal includes the first model that has completed learning, the second model that has completed learning, and the output unit.

Further, the twentieth aspect of the present disclosure is the inspection system according to any one of the seventh, fifteenth, and sixteenth aspects, wherein the first model that has completed learning is a YOLO that has completed learning.

Further, the twenty-first aspect of the present disclosure is the inspection system according to the seventh or seventeenth aspect, wherein the second model that has completed learning is generated by performing learning processing by using learning data, wherein in the learning data, partial image data of each of the regions determined to include the microorganism or the mold in the image data including a same type of the microorganism or the mold, and the type of the microorganism or the mold, are associated with each other.

Further, the twenty-second aspect of the present disclosure is the inspection system according to any one of the seventh, seventeenth, and twenty-first aspects, wherein the second model that has completed learning is a DML that has completed learning.

Further, the twenty-third aspect of the present disclosure is an inspection method performed by an inspection system for inspecting a microorganism or mold that is generated in an indoor environment or a device, the inspection method including an imaging step of directly capturing a sample collected from the indoor environment or the device; and an output step of inspecting the microorganism or the mold in captured image data, and outputting an inspection result.

Further, the twenty-fourth aspect of the present disclosure is an inspection method performed by an inspection system for inspecting a microorganism or mold that is generated in an indoor environment or a device, the inspection method including an imaging step of capturing an appearance of an individual unit of the microorganism or the mold collected from the indoor environment or the device; and an output step of inspecting the microorganism or the mold in captured image data, and outputting an inspection result.

DESCRIPTION OF EMBODIMENTS

Each embodiment will be described below with reference to the accompanying drawings. In the present specification and drawings, with respect to elements having substantially the same functional configuration, the same symbols are applied and overlapping descriptions are omitted.

First Embodiment

<Inspection Service Providing System in Learning Phase>

Figure 1:
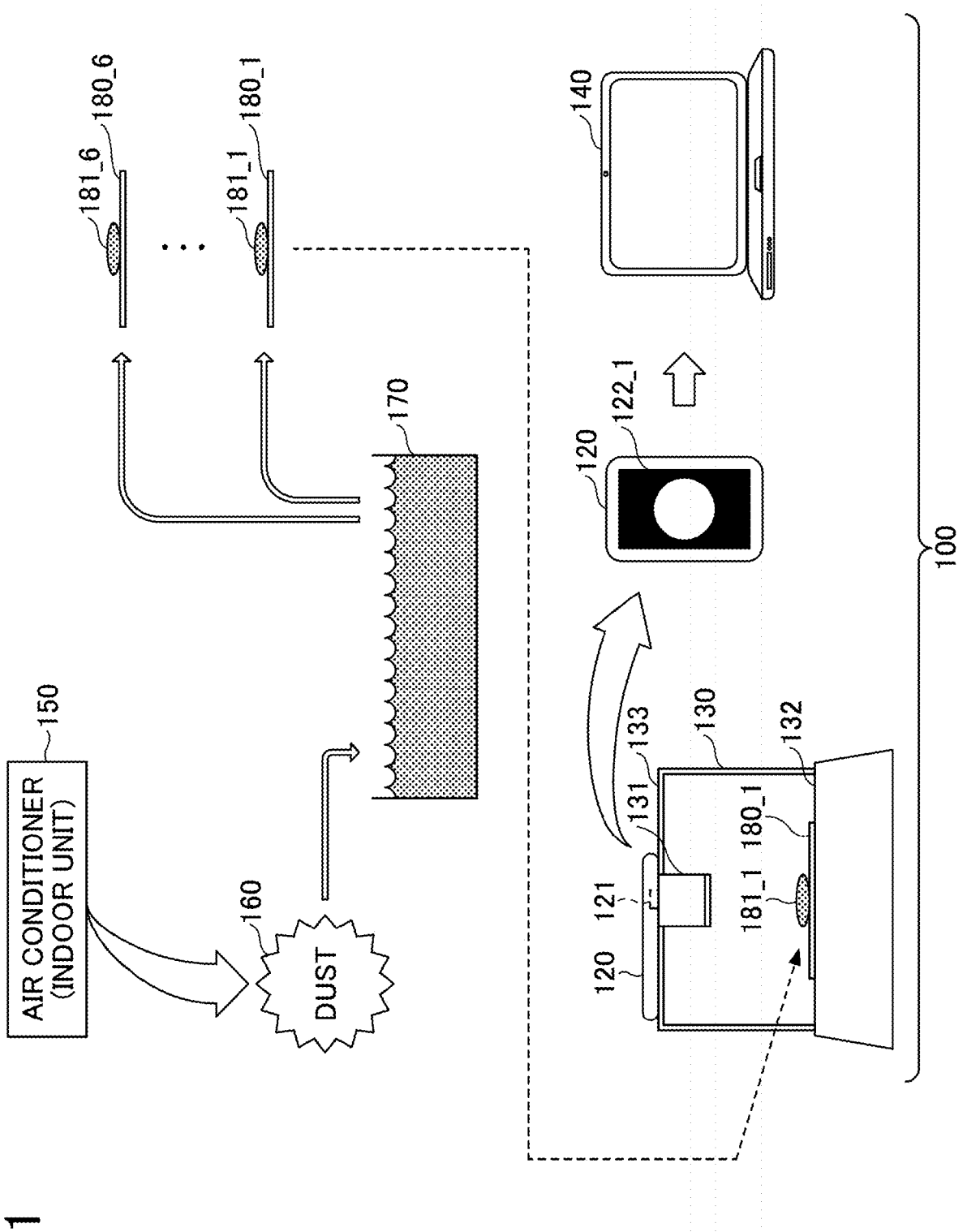
FIG. 1 is a first diagram illustrating an application example of the inspection service providing system in the learning phase.

First, an application example of an inspection service providing system in the learning phase, among the inspection service providing systems including the inspection system according to the first embodiment, will be described. FIG. 1 is a first diagram illustrating an application example of the inspection service providing system in the learning phase. As illustrated in FIG. 1, in the learning phase, an inspection service providing system 100 includes a mobile terminal 120 (an example of the inspection system according to the first embodiment), an imaging table 130, and an image processing apparatus 140.

In the learning phase, the imaging target captured by using the mobile terminal 120 is acquired by the following procedures and is directly captured under visible light (for example, under fluorescent light) or ultraviolet light.

(1) An experimenter takes a sample (dust 160) from an air conditioner (indoor unit) 150 subjected to an experiment (the dust 160 may be collected from the inside of the air conditioner (indoor unit) 150 or from the outside surface of the air conditioner (indoor unit) 150).

(2) The collected sample is dispersed and dissolved in a saline solution 170 including dissolved surfactants. In this case, "dispersing and dissolving the sample in a solution" may include "drying the sample that is dispersed and dissolved in the solution".

(3) The sample dissolved in the solution is taken from the solution 170 (for example, 10 microliters) and dropped on a glass slide to generate a preparation. At this time, each of the samples 181_1 to 181_6 is taken so that only the same type of environmental microorganisms are included in each sample, and by dropping each type on a different glass slide, the preparations 180_1 to 180_6 are generated. The example in FIG. 1 illustrates a case in which a sample (the dust 160) collected from an air conditioner (indoor unit) 150 has included six types of environmental microorganisms.

(4) The generated preparations 180_1 to 180_6 are sequentially mounted on the imaging table 130 as imaging targets, and are captured under visible light (for example, under fluorescent light) or ultraviolet light by using the mobile terminal 120.

That is, in the learning phase, "directly capture" means that the procedures from sample collection (1) to imaging (4) do not include "culturing of environmental microorganisms" (image capturing is performed without increasing the number of environmental microorganisms from the time the sample is collected). Further, "image capturing" means obtaining information about the appearance (color and shape) of an individual unit of environmental microorganism (in the case of mold, an individual unit of mold, specifically, one unit of spores and hyphae; in the case of bacteria, an individual unit of bacteria).

The imaging table 130 is configured to be portable and includes a lens 131, a mounting part 132, and a lens support part 133 as illustrated in FIG. 1.

The lens 131 enlarges the imaging target (in the example in FIG. 1, the preparation 180_1) to a predetermined magnification.

The mounting part 132 is a member on which an imaging target (in the example in FIG. 1, the preparation 180_1) is mounted.

The lens support part 133 is a member for supporting the lens 131 at a position separated by a predetermined distance from the imaging target mounted on the mounting part 132, and is a member on which the mobile terminal 120 is mounted on the upper surface. The lens support part 133 may be provided with a lifting mechanism for varying the distance between the imaging target mounted on the mounting part 132 and the lens 131.

The mobile terminal 120 includes a built-in imaging device 121 (an example of an imaging unit) and is mounted on the lens support part 133 so that the position of the lens 131 coincides with the position of the imaging device 121 to capture the imaging target (in the example in FIG. 1, the preparation 180_1) under visible light.

Further, in the learning phase, the mobile terminal 120 transmits the captured image data 122_1 to the image processing apparatus 140.

The image processing apparatus 140 generates learning data based on image data 122_1 transmitted from the mobile terminal 120. Further, the image processing apparatus 140 uses the generated learning data to perform learning processing with respect to the learning model and generates a model that has completed learning. The model that has completed learning generated in the learning phase is installed in the mobile terminal 120 in the inspection phase.

<Inspection Service Providing System in Inspection Phase>

Figure 2:
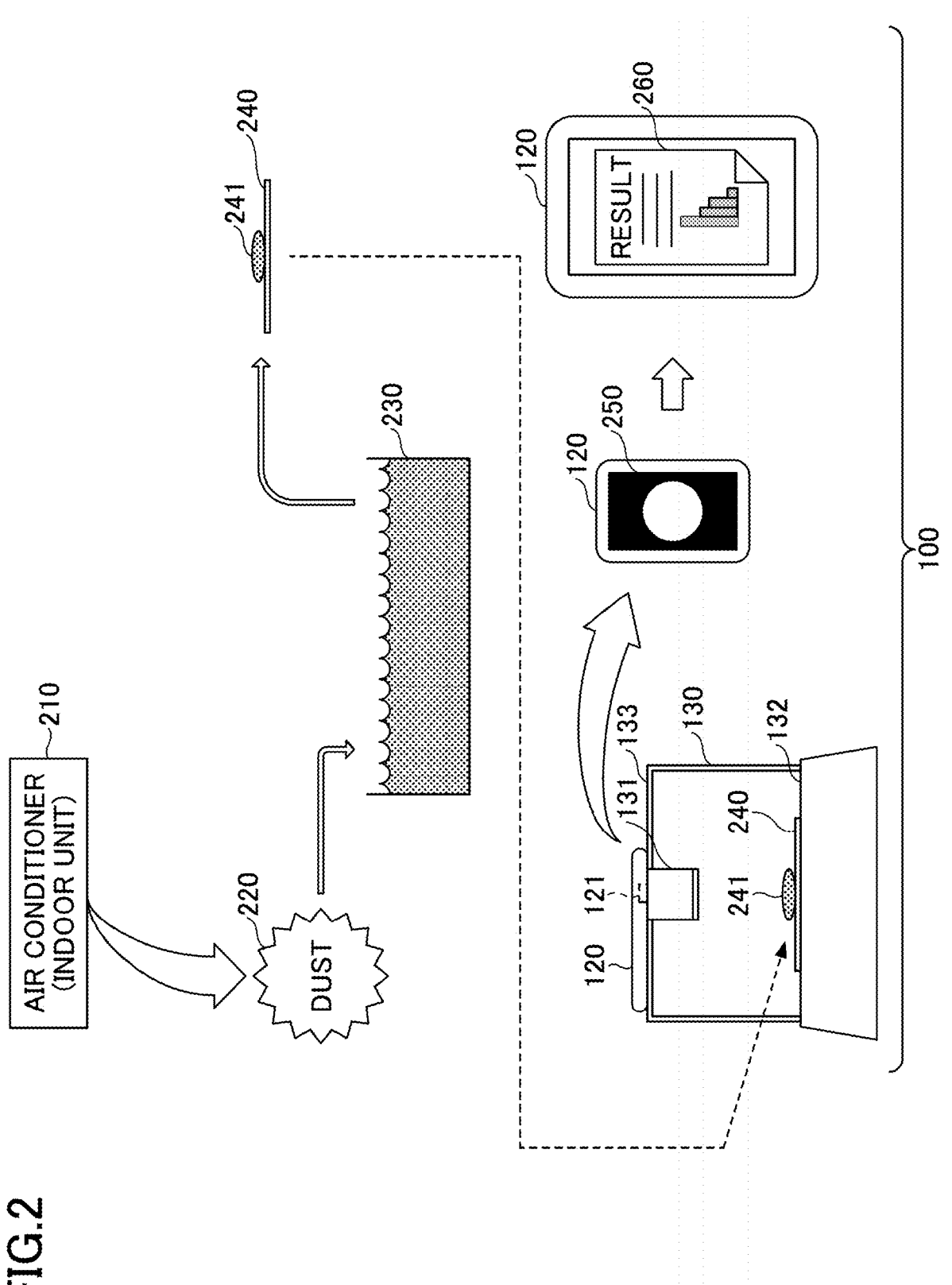
FIG. 2 is a first diagram illustrating an application example of the inspection service providing system in the inspection phase.

Next, an application example of the inspection service providing system in the inspection phase, among the inspection service providing systems including the inspection system according to the first embodiment, will be described. FIG. 2 is a first diagram illustrating an application example of the inspection service providing system in the inspection phase. As illustrated in FIG. 2, in the inspection phase, the inspection service providing system 100 includes the mobile terminal 120 (an example of the inspection system according to the first embodiment) and the imaging table 130.

In the inspection phase, the imaging target captured by using the mobile terminal 120 is acquired by the following procedures and is captured directly under visible light (for example, under fluorescent light) or ultraviolet light.

(1) A sample (dust 220) is collected from an air conditioner (indoor unit) 210 of the user to whom the service provider provides the inspection results (the results may be collected from the inside of the air conditioner (indoor unit) 210 or from the outside surface of the air conditioner (indoor unit) 210).

(2) The collected sample is dispersed and dissolved in a saline solution 230 including dissolved surfactants. In this case, "dispersing and dissolving the sample in a solution" may include "drying the sample that is dispersed and dissolved in the solution".

(3) The sample 241 dissolved in the solution is taken from the solution 230 (for example, 10 microliters) and dropped on a glass slide to generate a preparation 240.

(4) The generated preparation 240 is mounted on the imaging table 130 as an imaging target, and is captured under visible light (for example, under fluorescent light) or under ultraviolet light by using the mobile terminal 120.

That is, in the inspection phase, "directly capture" means that the procedures from sample collection (1) to imaging (4) do not include "culturing of environmental microorganisms" (image capturing is performed without increasing the number of environmental microorganisms from the time the sample is collected). Further, "image capturing" means obtaining information about the appearance (color and shape) of an individual unit of environmental microorganism (in the case of mold, an individual unit of mold, specifically, one unit of spores and hyphae; in the case of bacteria, an individual unit of bacteria).

As illustrated in FIG. 2, the imaging table 130 includes the lens 131, the mounting part 132, and the lens support part 133. The imaging table 130 used in the inspection phase is the same as the imaging table 130 used in the learning phase (FIG. 1), and, therefore, a detailed description of each part is omitted here.

The mobile terminal 120 includes a built-in imaging device 121 and is mounted on the lens support part 133 so that the position of the lens 131 coincides with the position of the imaging device 121 to capture an imaging target (in the example in FIG. 2, the preparation 240) under visible light (for example, under fluorescent light) or ultraviolet light.

In the inspection phase, the model that has completed learning is installed in the mobile terminal 120, and the captured image data 250 is processed by using the model that has completed learning to provide the inspection result 260.

Thus, by using the model that has completed learning to inspect the presence or absence, the types, etc., of environmental microorganisms, according to the inspection service providing system 100, the following effects can be achieved.

Even with respect to environmental microorganisms that are similar in shape regardless of type, such as mold (a member of the kingdom of fungi, especially yeast and ascomycetes), the environmental microorganisms can be accurately identified in the captured image data.

Because no culture method is required, it is possible to shorten the time required to provide inspection results, and for example, when a service provider visits a user to whom inspection results are to be provided, it is possible to collect samples from the user's air conditioner and provide the inspection results on the spot. As a result, it is possible to immediately make proposals (such as cleaning the air conditioner and replacing the filter) to realize an optimal air environment according to the inspection results.

Because no culture method is required, it is possible to reduce the cost of providing the inspection results (eliminating the need to hire a specialist).

Because no culture method is required, dead environmental microorganisms (that is, not only live bacteria but also dead bacteria) can also be identified (eliminating the need to collect live environmental microorganisms).

<Hardware Configuration of Mobile Terminal and Image Processing Apparatus>

Figure 3:
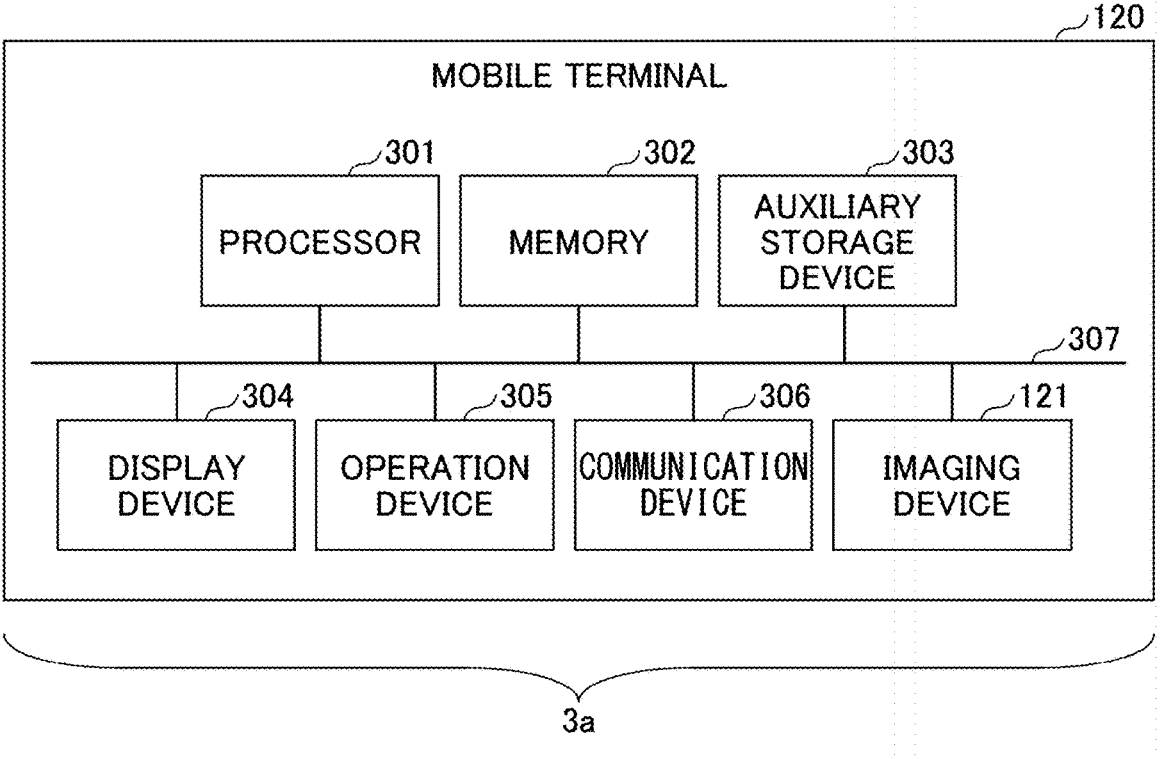
FIG. 3 is a diagram illustrating an example of the hardware configuration of a mobile terminal and an image processing apparatus.
Figure 3:
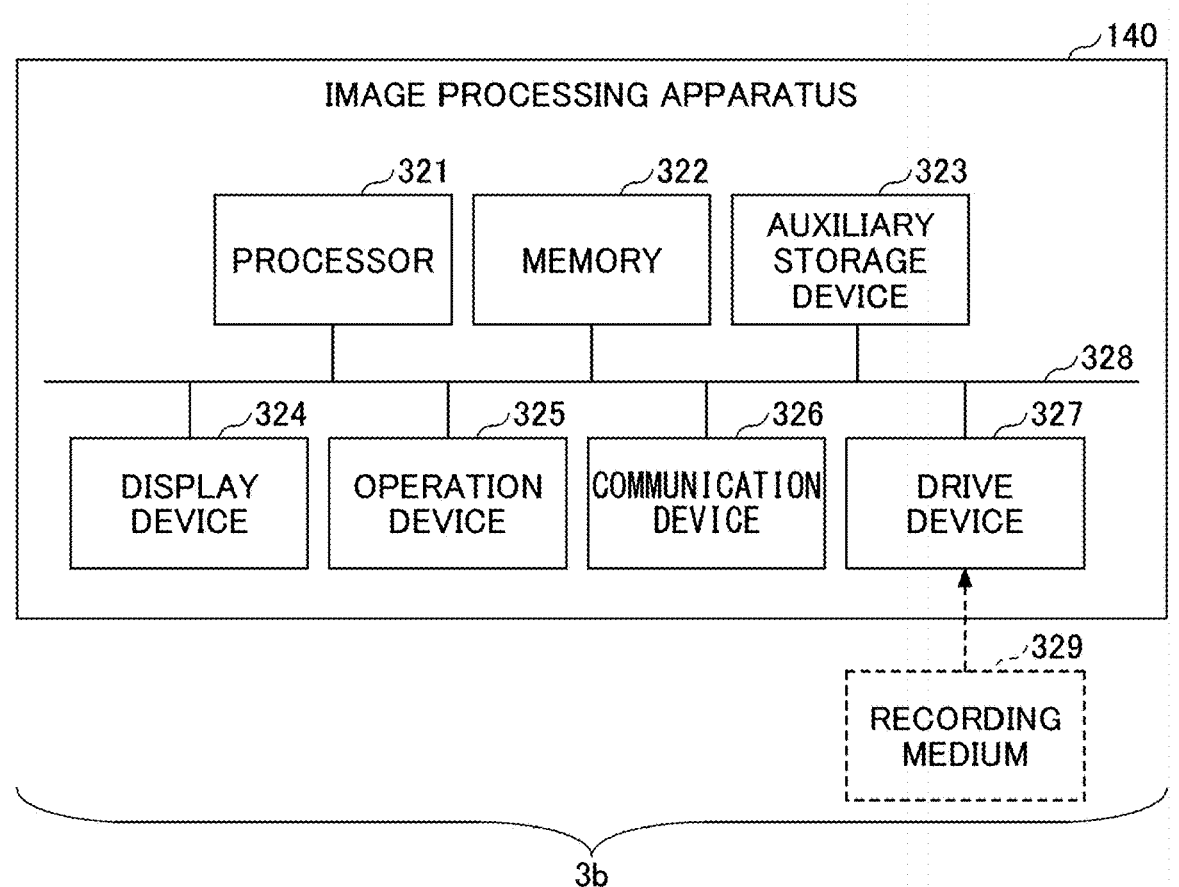

Next, the hardware configuration of the mobile terminal 120 and the image processing apparatus 140 will be described. FIG. 3 illustrates an example of the hardware configuration of the mobile terminal and the image processing apparatus.

(1) Hardware Configuration of the Mobile Terminal

In FIG. 3, the notation of 3a indicates an example of a hardware configuration of the mobile terminal 120. As illustrated in 3a in FIG. 3, the mobile terminal 120 has includes a processor 301, a memory 302, an auxiliary storage device 303, a display device 304, an operation device 305, a communication device 306, and the imaging device 121. Each piece of hardware of the mobile terminal 120 is connected to each other via a bus 307.

The processor 301 includes various computing devices such as a CPU (Central Processing Unit) and a GPU (Graphics Processing Unit). The processor 301 reads various programs (for example, in the inspection phase, an inspection program, etc.) into the memory 302 and executes the programs.

The memory 302 includes a main storage device such as a ROM (Read Only Memory) and a RAM (Random Access Memory). The processor 301 and the memory 302 form what is referred to as computer, and the processor 301 executes various programs read on the memory 302, and the computer implements various functions.

The auxiliary storage device 303 stores various programs and various types of data used when various programs are executed by the processor 301.

The display device 304 is a display device for displaying the captured image data 122_1, 250, the inspection results 260, etc. The operation device 305 is an input device used for inputting various instructions to the mobile terminal 120.

The communication device 306 is, for example, a communication device for communicating with the image processing apparatus 140. The imaging device 121 captures the preparations 180_1 to 180_6 and 240 that are imaging targets.

Various programs installed in the auxiliary storage device 303 are installed, for example, by being downloaded from a network via the communication device 306.

(2) Hardware Configuration of the Image Processing Apparatus

In FIG. 3, the notation of 3b indicates an example of a hardware configuration of the image processing apparatus 140. The hardware configuration of the image processing apparatus 140 is almost the same as that of the mobile terminal 120, and, therefore, the differences from the mobile terminal 120 will be mainly described here.

A processor 321 reads and executes, for example, a learning program or the like on the memory 322. An auxiliary storage device 323 implements, for example, a learning data storage unit (to be described later).

A drive device 327 is a device for setting a recording medium 329. The recording medium 329 here includes media for recording information optically, electrically, or magnetically, such as a CD-ROM, a flexible disk, a magneto-optical disk, etc. The recording medium 329 may also include a semiconductor memory, etc., for electrically recording information, such as a ROM, flash memory, etc.

Various programs installed in the auxiliary storage device 323 are installed, for example, when the distributed recording medium 329 is set in the drive device 327 and various programs recorded in the recording medium 329 are read by the drive device 327. Alternatively, various programs installed in the auxiliary storage device 323 may be installed by being downloaded from the network via the communication device 326.

<Functional Configuration of Image Processing Apparatus>

Next, the functional configuration of the image processing apparatus 140 will be described. As described above, a learning program is installed in the image processing apparatus 140, and when the program is executed, the image processing apparatus 140 implements the following functions.

> Functions related to learning data generation processing for generating learning data
>
> Functions related to learning processing for performing learning processing with respect to a learning model by using learning data, etc.

In the following, these functions implemented by the image processing apparatus 140 will be explained separately.

(1) Functions Related to Learning Data Generation Processing

Figure 4:
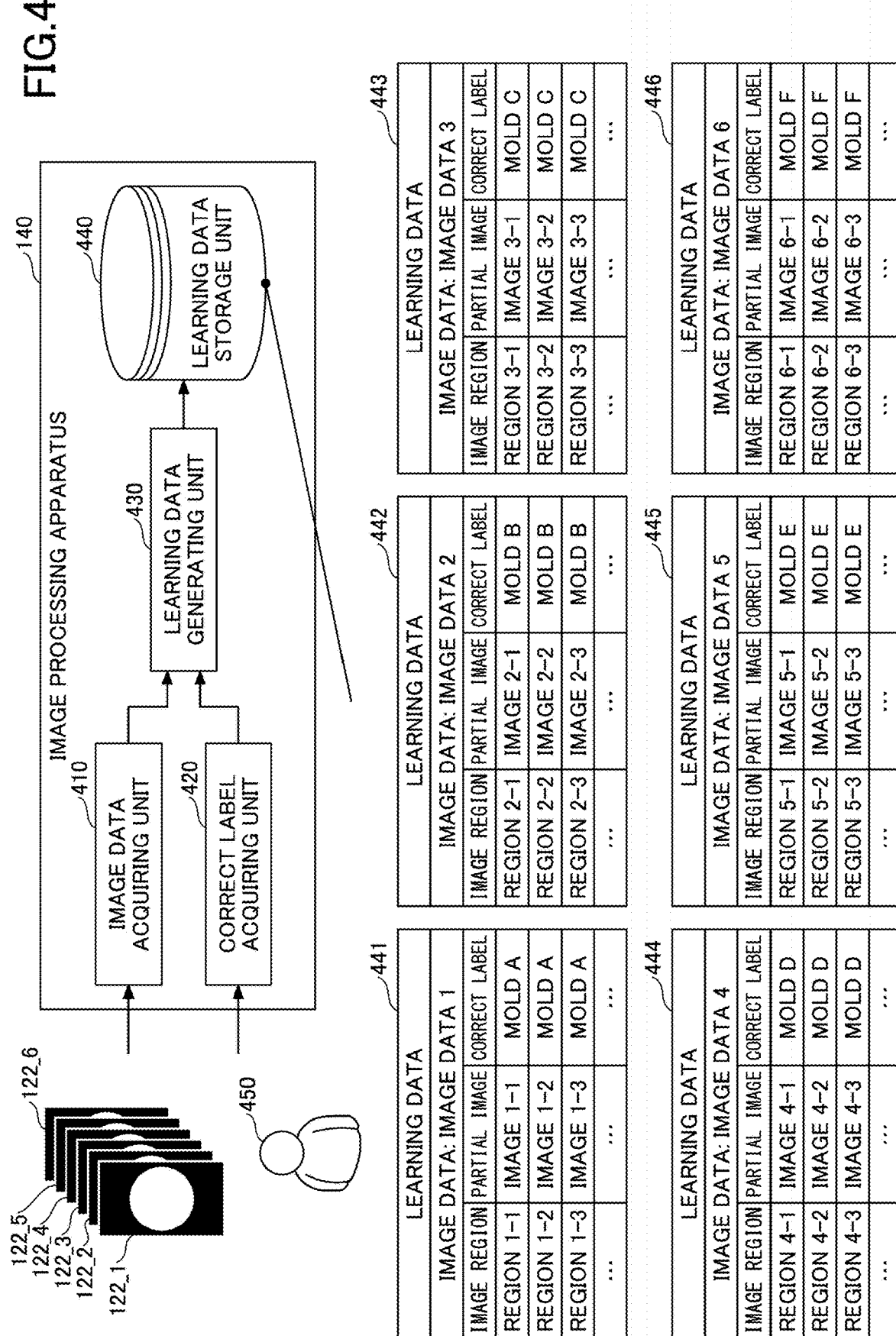
FIG. 4 is a diagram illustrating an example of the functional configuration of a function related to learning data generation processing of an image processing apparatus.

First, the functions related to the learning data generation processing are described. FIG. 4 illustrates an example of the functional configuration of the functions related to the learning data generation processing of the image processing apparatus. As illustrated in FIG. 4, the image processing apparatus 140 includes an image data acquiring unit 410, a correct label acquiring unit 420, and a learning data generating unit 430 as functions related to the learning data generation processing.

The image data acquiring unit 410 acquires image data 122_1 to 122_6 captured under visible light (for example, under fluorescent light) or under ultraviolet light by the mobile terminal 120 in the learning phase. The image data 122_1 to 122_6 is image data respectively obtained by capturing the preparation 180_1 to 180_6 under visible light (for example, under fluorescent light) or under ultraviolet light.

The correct label acquiring unit 420 acquires the correct label input by an experimenter 450. The experimenter 450 inputs the type of environmental microorganism included in each sample 181_1 to 181_6 of the preparation 180_1 to 180_6 to the image processing apparatus 140 as correct data, and the correct label acquiring unit 420 acquires the correct data.

In the present embodiment, the experimenter 450 inputs "mold A" as the type of environmental microorganism included in the sample 181_1 and inputs "mold B" as the type of environmental microorganism included in the sample 181_2. Further, the experimenter 450 inputs "mold C" as the type of environmental microorganism included in the sample 181_3 and inputs "mold D" as the type of environmental microorganism included in the sample 181_4. Further, the experimenter 450 inputs "mold E" as the type of environmental microorganism included in the sample 181_5 and inputs "mold F" as the type of environmental microorganism included in the sample 181_6.

The learning data generating unit 430 generates learning data by associating the image data 122_1 to 122_6 acquired by the image data acquiring unit 410 with the corresponding types of environmental microorganisms ("mold A" to "mold F"") acquired by the correct label acquiring unit 420. Further, the learning data generating unit 430 also stores the generated learning data in the learning data storage unit 440.

In FIG. 4, the learning data 441 to 446 indicates the learning data generated by the learning data generating unit 430 and stored in a learning data storage unit 440. As illustrated in FIG. 4, the learning data 441 to 446 includes "image data", "image region", "partial image", and "correct label" as items of information.

Among these, the file name of the image data acquired by the image data acquiring unit 410 is stored in the "image data". In the example of FIG. 4, "image data 1" to "image data 6" are the file names of the image data 122_1 to 122_6, respectively.

The "image region" stores position information (multiple sets of (x-coordinate, y-coordinate), such as (x-coordinate, y-coordinate) of two opposite vertices of a region) of each region determined to include one environmental microorganism in the image data. In the case of FIG. 4, for example, "region 1-1" (=coordinates $(x_{11a}, y_{11a})$, $(x_{11b}, y_{11b})$) is stored.

The file name of the image data (partial image data) of each region determined to include one environmental microorganism in the image data, identified by the "image region", is stored in the "partial image". Incidentally, including one environmental microorganism means, for example, including one spore unit in the case where the environmental microorganism is a mold.

The "correct label" stores the type of environmental microorganism in each region identified by the "image region". In the case of the example in FIG. 4, "mold A" to "mold F" are stored from the "correct label" of the learning data 441 to the "correct label" of the learning data 446, respectively.

(2) Functions Related to Learning Processing

Figure 5:
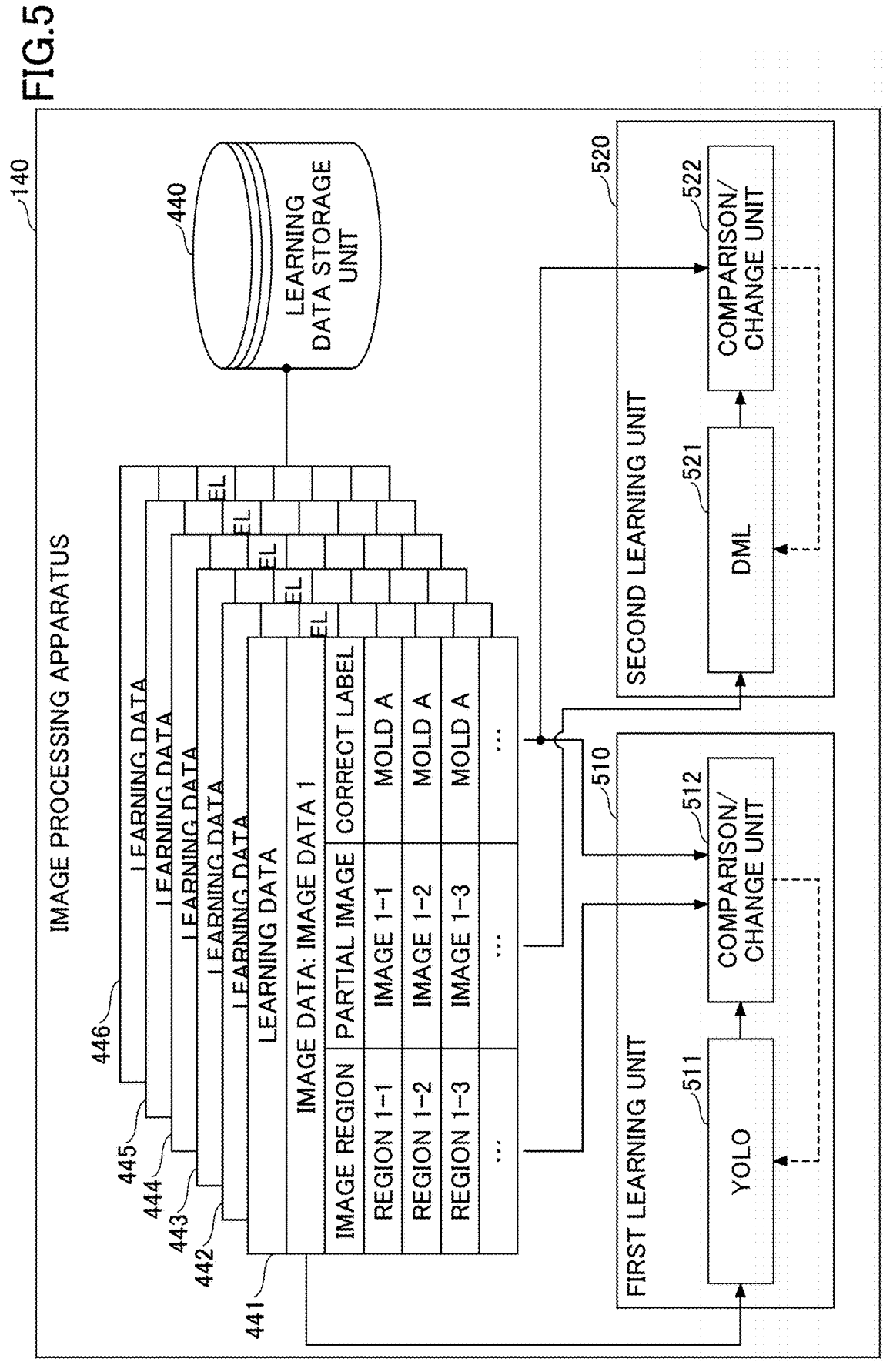
FIG. 5 is a diagram illustrating an example of the functional configuration of a function related to learning processing of an image processing apparatus.

Next, functions related to the learning processing will be described. FIG. 5 is a diagram illustrating an example of the functional configuration of the functions related to the learning processing of the image processing apparatus. As illustrated in FIG. 5, the image processing apparatus 140 includes a first learning unit 510 and a second learning unit 520 as the functions related to learning processing.

The first learning unit 510 learns the processing for determining the region including environmental microorganism in the image data. Specifically, the first learning unit 510 includes the YOLO 511 and a comparison/change unit 512.

The YOLO 511 is a learning model that determines the position information of each region in the image data and the attribute information of each region (whether the region includes an environmental microorganism, etc.) by taking the image data of the file name identified by the "image data" as an input in the learning data.

The comparison/change unit 512 compares the position information of each region and the attribute information of each region determined by the YOLO 511 with the position information of each region determined to include the environmental microorganism identified by the "image region" of the learning data and calculates the error. Further, the comparison/change unit 512 back-propagates the calculated error and updates the model parameters of the YOLO 511.

For example, in the case of the learning data 441, the comparison/change unit 512 compares > the position information of each region and the attribute information of each region that is output from the YOLO 511 by inputting image data 122_1 of file name="image data 1" into the YOLO 511, with the position information of each region determined to include environmental microorganisms identified by image region="region 1-1", "region 1-2", "region 1-3", . . . , and calculates the error.

The second learning unit 520 learns the process of determining the type of environmental microorganism from the image data (partial image data) of each region determined to include the environmental microorganism in the image data. Specifically, the second learning unit 520 includes Deep Metric Learning (DML) 521 and a comparison/change unit 522.

In learning data, the DML 521 is a learning model that outputs the types of environmental microorganisms (in the present embodiment, six types) (outputs six types of classification probabilities) by using partial image data identified by a "partial image" as input.

The comparison/change unit 522 compares the type of environmental microorganism determined by the DML 521 with (classification probability (for example, 1.0) of) the type of environmental microorganism identified by a "correct label" in the learning data and calculates the error. Further, the comparison/change unit 522 back-propagates the calculated error and updates the model parameters of the DML 521.

For example, in the case of the learning data 441, the comparison/change unit 522 compares the type of environmental microorganism determined by the DML 521 by inputting the partial image data of the file name="image 1-1" into the DML 521, with correct label="mold A", and calculates the error.

<Functional Configuration of Mobile Terminal>

Next, the functional configuration of the mobile terminal 120 will be described. As described above, an inspection program is installed in the mobile terminal 120, and when the program is executed, the function related to inspection processing is implemented by the mobile terminal 120. Therefore, the following describes the function related to inspection processing implemented by the mobile terminal 120.

Figure 6:
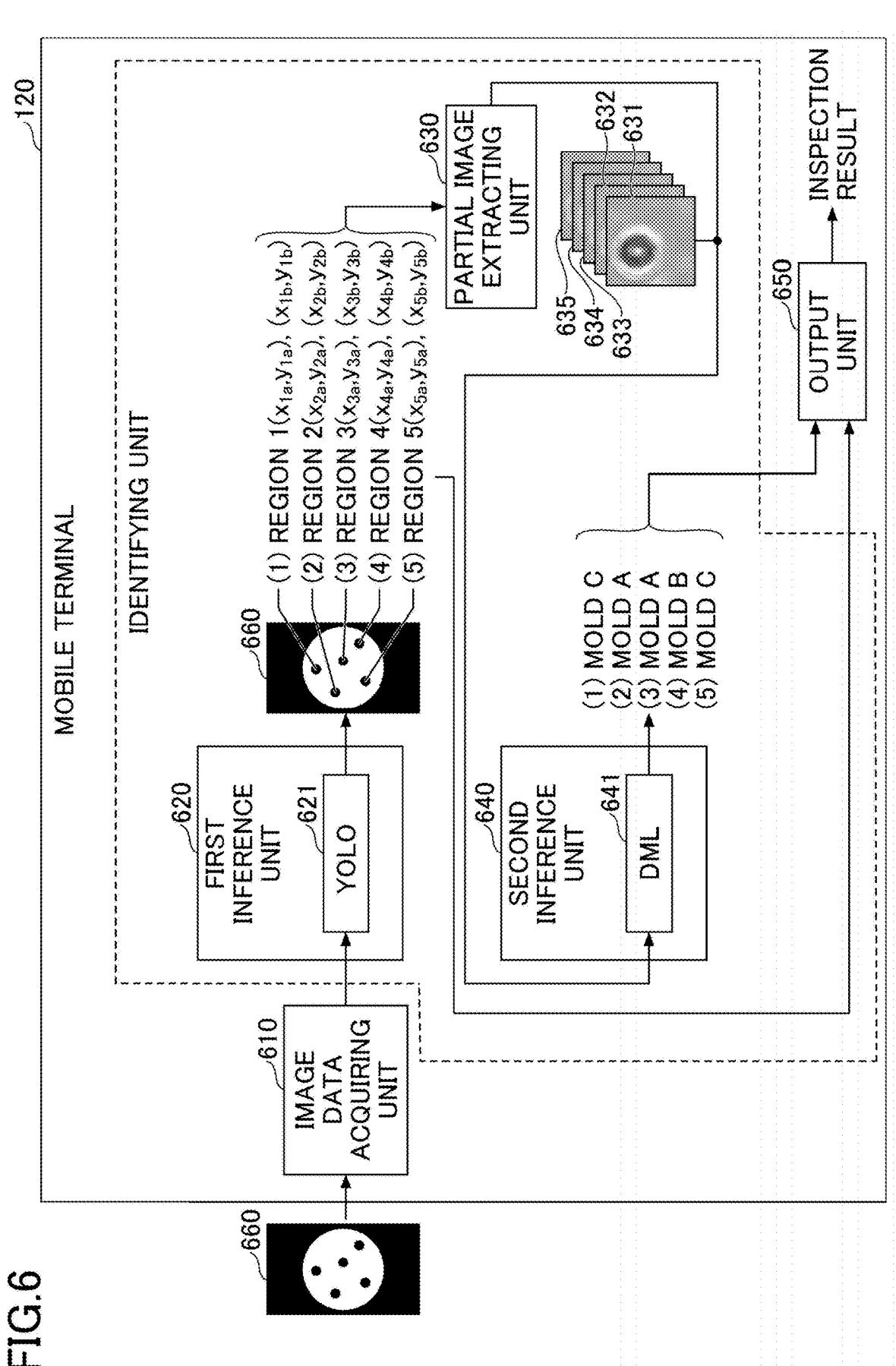
FIG. 6 is a diagram illustrating an example of the functional configuration of a function related to inspection processing of a mobile terminal.

FIG. 6 illustrates an example of the functional configuration of the functions related to inspection processing of the mobile terminal. As illustrated in FIG. 6, the mobile terminal 120 includes an image data acquiring unit 610, a first inference unit 620, a partial image extracting unit 630, a second inference unit 640, and an output unit 650 as functions related to inspection processing. The first inference unit 620, the partial image extracting unit 630, and the second inference unit 640 function as identifying units for identifying environmental microorganisms in the image data.

The image data acquiring unit 610 acquires image data 660 captured under visible light (for example, under fluorescent light) or under ultraviolet light in the inspection phase. The image data 660 is image data in which preparation 240 is captured under visible light (for example, under fluorescent light) or under ultraviolet light.

The first inference unit 620 includes a YOLO 621 that has completed learning (an example of the first model that has completed learning) generated by the first learning unit 510 performing learning processing on the YOLO 511 in the learning phase. The first inference unit 620 executes the YOLO 621 that has completed learning by inputting the image data 660 to the YOLO 621 that has completed learning. With this, the YOLO 621 that has completed learning determines the position information of each region in the image data 660 and the attribute information of each region (whether or not environmental microorganisms are included, etc.).

The example in FIG. 6 illustrates that in the image data 660, the following are determined.

Coordinates $(x_{1a}, y_{1a})$, $(x_{1b}, y_{1b})$ are determined as position information of region 1, and it is determined that this region includes environmental microorganisms.

Coordinates $(x_{2a}, y_{2a})$, $(x_{2b}, y_{2b})$ are determined as position information of region 2, and it is determined that this region includes environmental microorganisms.

Coordinates $(x_{3a}, y_{3a})$, $(x_{3b}, y_{3b})$ are determined as position information of region 3, and it is determined that this region includes environmental microorganisms.

Coordinates $(x_{4a}, y_{4a})$, $(x_{4b}, y_{4b})$ are determined as position information of region 4, and it is determined that this region includes environmental microorganisms.

Coordinates $(x_{5a}, y_{5a})$, $(x_{5b}, y_{5b})$ are determined as position information of region 5, and it is determined that this region includes environmental microorganisms.

It is determined that regions other than regions 1 to 5 do not include environmental microorganisms.

Note that the first inference unit 620 reports, to the partial image extracting unit 630 and the output unit 650, the position information of each region in the image data 660 and the attribute information of each region determined by the YOLO 621 that has completed learning.

The partial image extracting unit 630 extracts image data (partial image data) of each region including environmental microorganisms in the image data 660 based on the position information of each region in the image data 660 and the attribute information of each region reported by the first inference unit 620. The example in FIG. 6 illustrates how the partial image extracting unit 630 extracts partial image data 631 to 635 of regions 1 to 5.

The partial image extracting unit 630 reports, to the second inference unit 640, the extracted partial image data 631 to 635.

The second inference unit 640 includes a DML 641 (a second model that has completed learning) generated by the second learning unit 520 performing learning processing on the DML 521 in the learning phase. The second inference unit 640 executes the DML 641 that has completed learning, by inputting partial image data 631 to 635 to the DML 641 that has completed learning. Thus, the DML 641 that has completed learning determines the type of environmental microorganism included in each piece of the partial image data 631 to 635.

The example in FIG. 6 illustrates how the DML 641 that has completed learning determines "mold C" by inputting the partial image data 631, and the DML 641 that has completed learning determines "mold A" by inputting the partial image data 632. The example in FIG. 6 illustrates how the DML 641 that has completed learning determines "mold A" by inputting partial image data 633 and the DML 641 that has completed learning determines "mold B" by inputting partial image data 634. Furthermore, the example in FIG. 6 illustrates how the DML 641 that has completed learning determines "mold C" by inputting partial image data 635.

Note that the second inference unit 640 reports, to the output unit 650, the type of environmental microorganism determined by the DML 641 that has completed learning.

The output unit 650 performs visualization processing based on the position information and attribute information of each region in the image data 660 reported by the first inference unit 620 and the type of environmental microorganism reported by the second inference unit 640 to generate the inspection result and display the inspection result on the display device 304.

Note that the inspection result generated by the output unit 650 includes, for example:

image data in which each region determined to include environmental microorganism in the image data 660 is colored by the color according to the type of environmental microorganism, aggregate data totaling the number (or percentage) of each type of environmental microorganisms in the image data 660, etc.

Thus, "inspection" in the inspection phase involves at least quantifying the types and numbers of environmental microorganisms.

Examples of Inspection Results Provided

Figure 7:
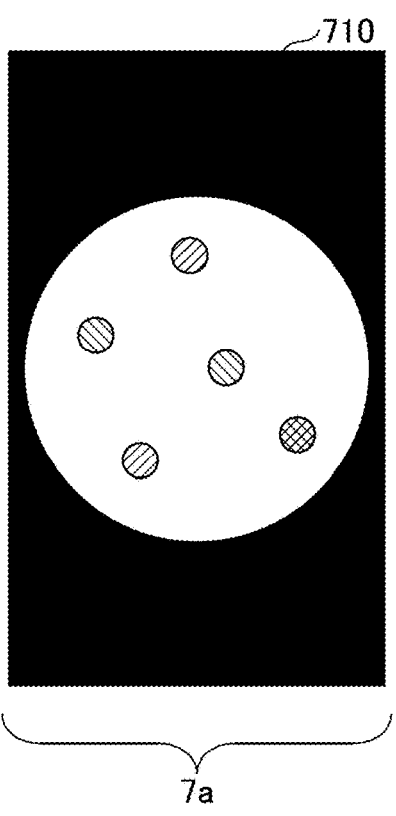
FIG. 7 is a diagram illustrating an example of provision of inspection results by a mobile terminal.

Next, an example of inspection results provided by the mobile terminal 120 will be described. FIG. 7 illustrates an example of inspection results provided by the mobile terminal.

In FIG. 7, the notation of 7a indicates an example of image data 710 in which each region determined to include environmental microorganisms in the image data 660 is colored by the color according to the type of environmental microorganisms. The example of 7a in FIG. 7 illustrates how "mold C" is colored in blue, "mold A" is colored in red, and "mold C" is colored in yellow (in 7a of FIG. 7, for convenience, the types are represented by different types of hatching).

In FIG. 7, the notation of 7b indicates an example of aggregated data 720 in which the number of each type of environmental microorganism in the image data 660 is aggregated. As illustrated in 7b in FIG. 7, aggregated data 720 includes "mold type" and "number" as items of information. Among these, "mold type" stores the names of six types of mold and other types ("other"), and "number" stores the number of the corresponding type of mold or the number of the other types.

<Flow of Learning Processing>

Figure 8:
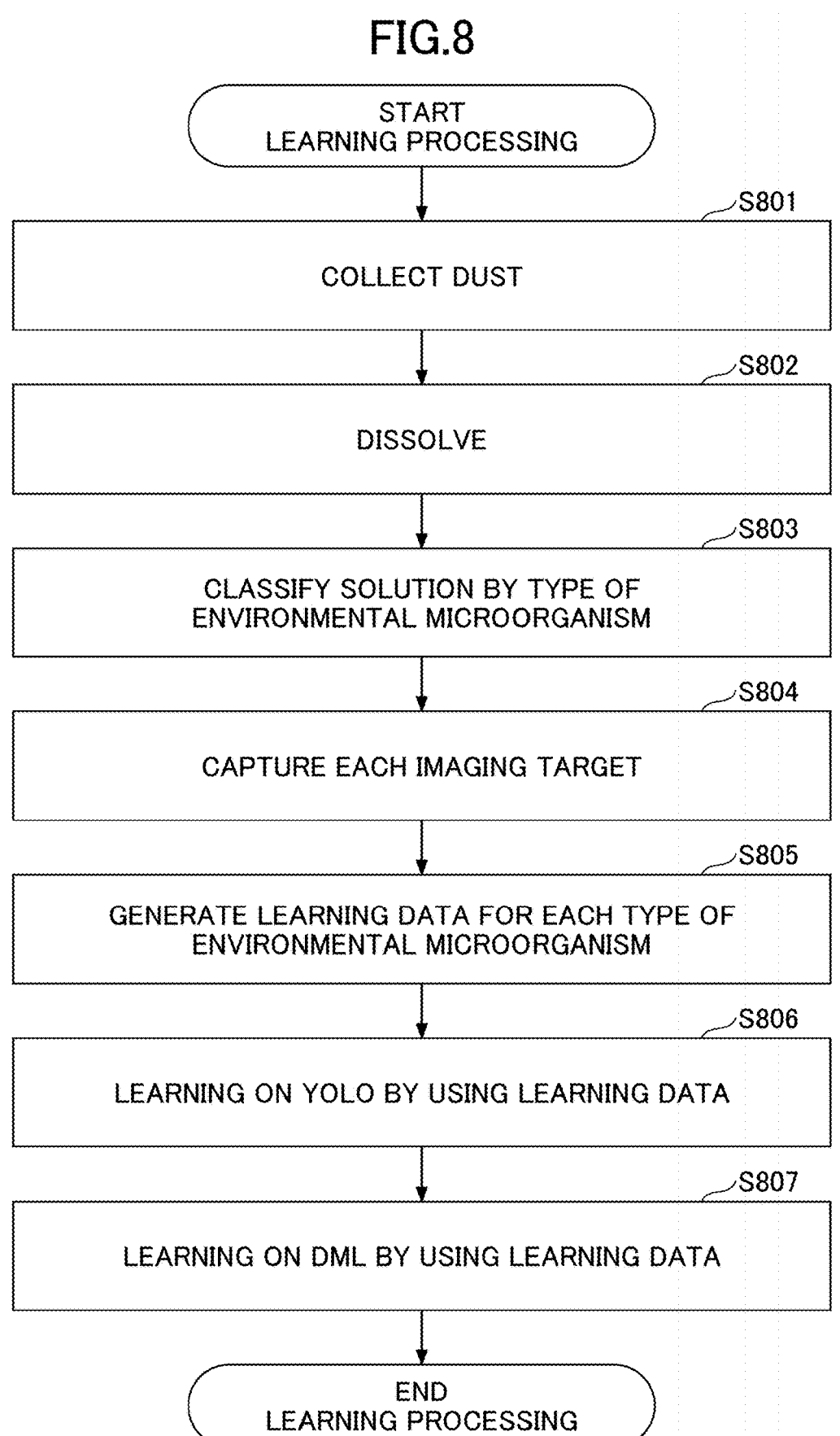
FIG. 8 is a flowchart illustrating the flow of the learning processing.

Next, the flow of learning processing by the inspection service providing system 100 will be described. FIG. 8 is a flowchart illustrating the flow of learning processing.

In step S801, the experimenter 450 collects dust 160 from the air conditioner (indoor unit) 150 used for the experiment.

In step S802, the experimenter 450 disperses and dissolves the collected sample into a solution.

In step S803, the experimenter 450 classifies the solution by the type of environmental microorganism.

In step 3804, the experimenter 450 takes a sample from each of the classified solutions and drops the sample on a slide glass to generate the preparations 180_1 to 180_6. Further, the experimenter 450 captures the generated preparation 180_1 to 180_6 (the imaging target) under visible light (for example, under fluorescent light) or ultraviolet light by using the mobile terminal 120.

In step S805, the image processing apparatus 140 generates learning data 441 to 446 for each type of environmental microorganism based on the captured image data.

In step S806, the image processing apparatus 140 uses the generated learning data 441 to 446 to perform learning processing on the YOLO to learn the position information and attribute information of each region in the image data.

In step S807, the image processing apparatus 140 uses the generated learning data 441 to 446 to perform learning processing on the DML to learn the types of environmental microorganisms in the partial image data of each region in the image data.

<Flow of Inspection Processing>

Figure 9:
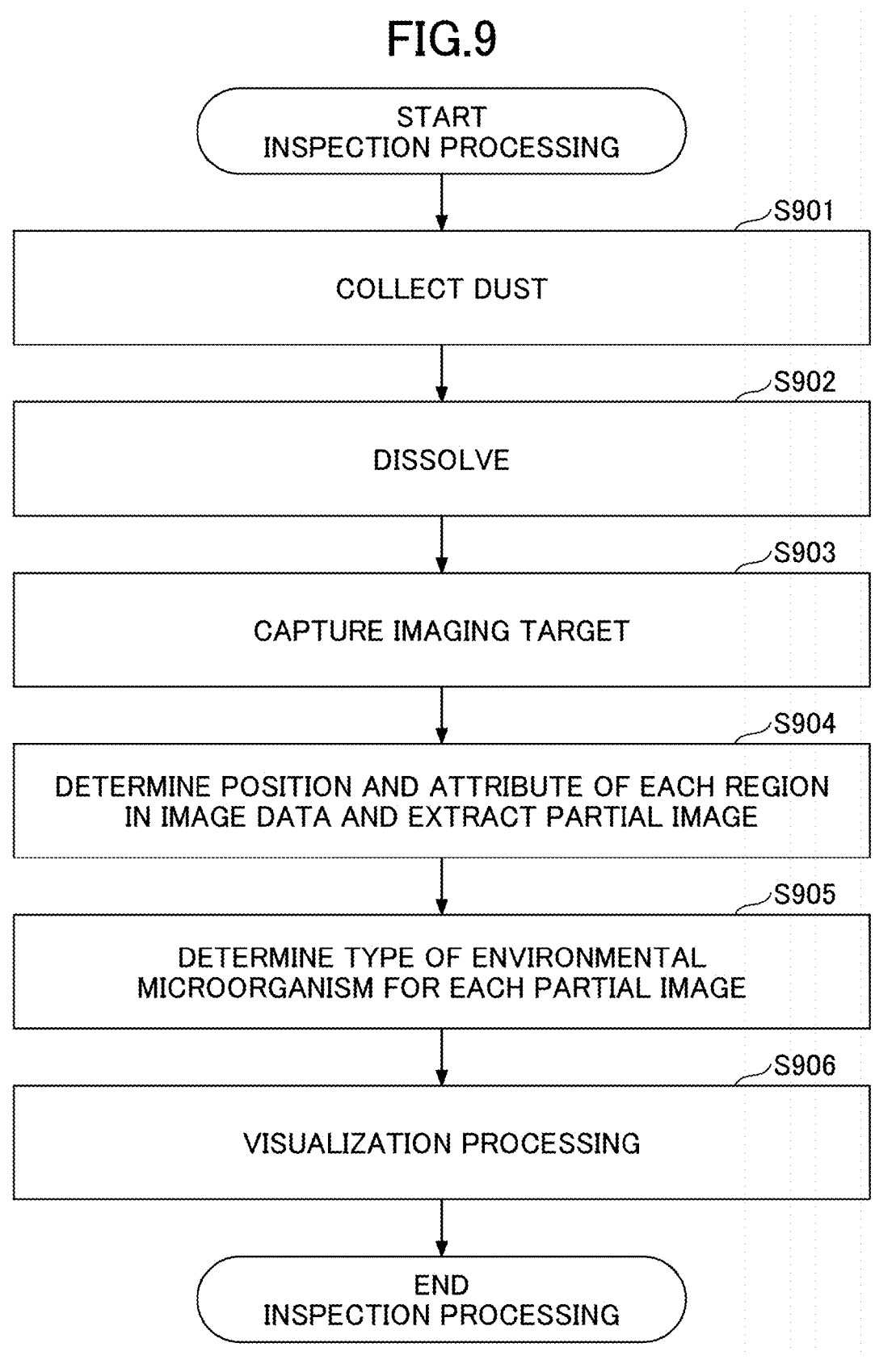
FIG. 9 is a flowchart illustrating the flow of the inspection processing.

Next, the flow of inspection processing by the inspection service providing system 100 will be described. FIG. 9 is a flowchart illustrating the flow of inspection processing.

In step S901, the service provider collects dust 220 from the air conditioner (indoor unit) 210 of the user to whom the inspection results are to be provided.

In step S902, the service provider disperses and dissolves the collected sample into a solution.

In step S903, the service provider takes a sample from the solution and drops the sample onto a slide glass to generate the preparation 240. Further, the service provider captures the generated preparation 240 (the imaging target) under visible or ultraviolet light by using the mobile terminal 120.

In step S904, the mobile terminal 120 determines position information and attribute information of each region in the captured image data, and extracts partial image data of each region determined to include environmental microorganisms.

In step S905, the mobile terminal 120 determines the type of environmental microorganism in each piece of the extracted partial image data.

In step S906, the mobile terminal 120 performs visualization processing based on the position information and attribute information of each region in the image data and the type information of environmental microorganisms, and provides the user with the inspection results.

SUMMARY

As is clear from the above description, the mobile terminal 120, which is an example of the inspection system according to the first embodiment, performs the following.

The collected dust is dissolved into a solution, and the preparation generated by dropping the solution onto the slide glass is captured as an imaging target through a lens under visible or ultraviolet light. That is, the dust is captured directly or the appearance of an environmental microorganism is captured.

The environmental microorganisms in the captured image data are identified by using the YOLO that has completed learning to determine the attributes of each region in the image data, and by using the DML that has completed learning to determine the type of environmental microorganism for the regions determined to include the environmental microorganisms.

The visualization process is performed on the environmental microorganisms in the identified image data and the inspection results are provided.

Thus, by using the model that has completed learning to identify the environmental microorganisms in the image data, the mobile terminal, which is an example of the inspection system, can accurately identify the environmental microorganisms in the captured image data even if the environmental microorganisms are similar in shape.

This eliminates the need for culture methods and reduces the time required to provide inspection results. As a result, for example, when a service provider visits a user to whom inspection results are to be provided, a sample can be collected from the user's air conditioner and the inspection results can be provided on the spot.

That is, according to the first embodiment, an inspection system and an inspection method that reduce the time required to inspect environmental microorganisms, can be provided.

Second Embodiment

The first embodiment described above is a case where the mobile terminal 120 functions as an inspection system including the imaging device 121, the identifying unit (the second inference unit 640, etc.), and the output unit 650. However, some functions of the mobile terminal 120 may be arranged on the imaging table, and an inspection system may be formed by the imaging table and the mobile terminal 120.

Figure 10:
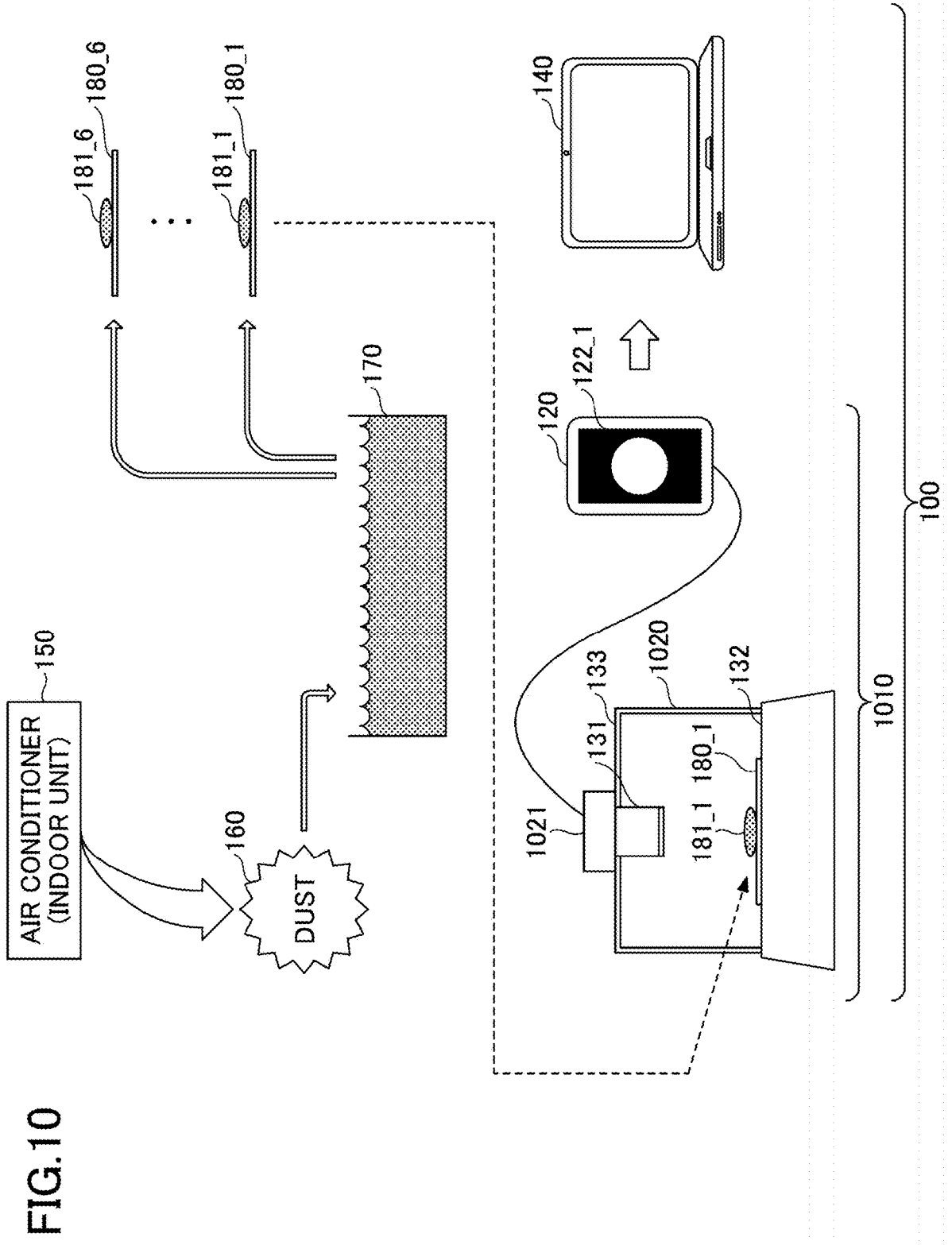
FIG. 10 is a second diagram illustrating an application example of the inspection service providing system in the learning phase.

FIG. 10 is a second diagram illustrating an application example of the inspection service providing system in the learning phase. The difference from FIG. 1 is that in the case of the second embodiment, the inspection service providing system 100 in the learning phase includes an inspection system 1010 and the image processing apparatus 140, and the inspection system 1010 includes an imaging table 1020 and the mobile terminal 120. The difference from FIG. 1 is that in the case of the second embodiment, the imaging table 1020 includes an imaging device 1021 and is connected to the mobile terminal 120.

Figure 11:
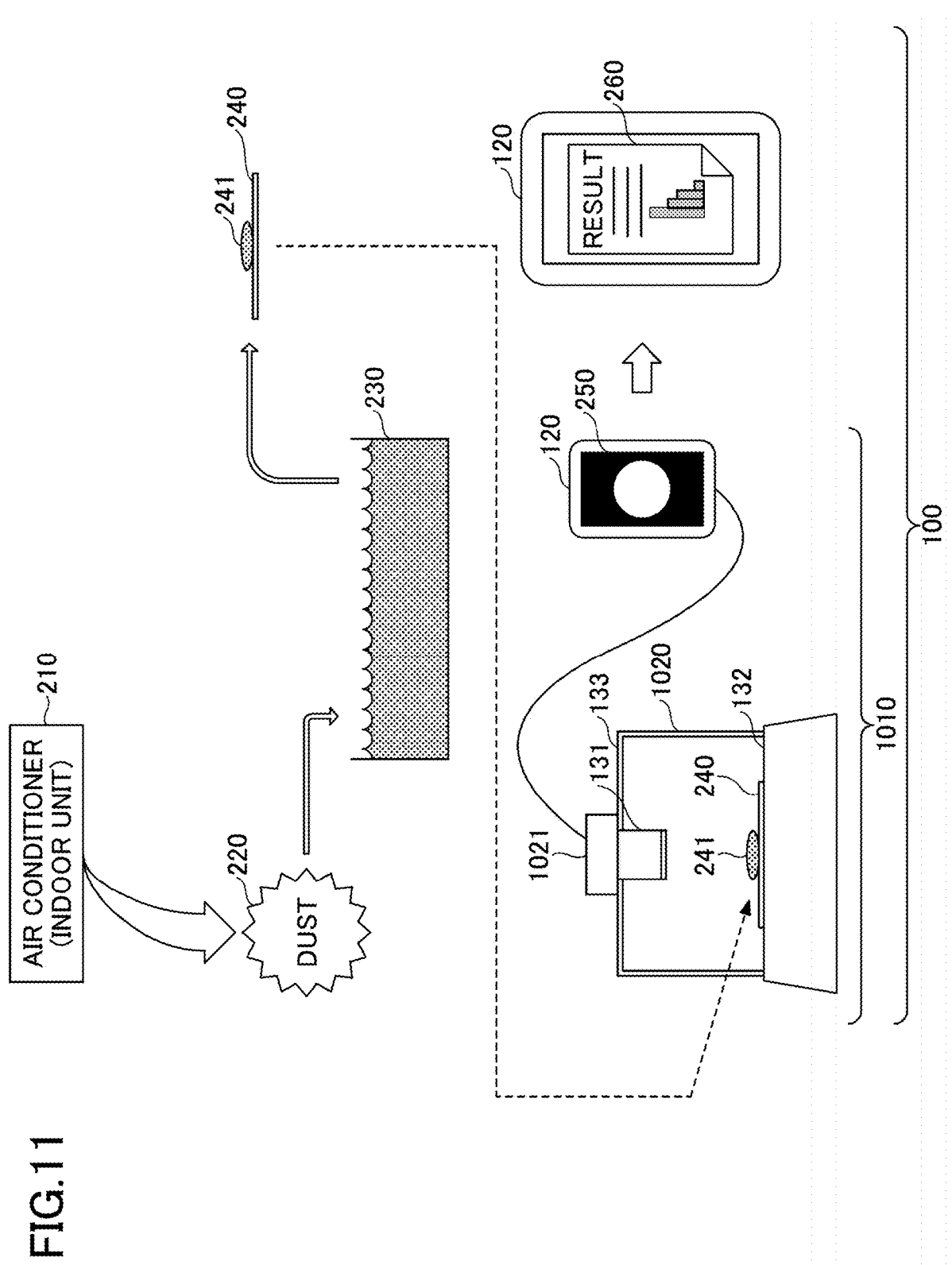
FIG. 11 is a second diagram illustrating an application example of the inspection service providing system in the inspection phase.

Similarly, FIG. 11 is a second diagram illustrating an application example of the inspection service providing system in the inspection phase. The difference from FIG. 2 is that in the case of the second embodiment, the inspection service providing system 100 in the inspection phase includes an inspection system 1010, and the inspection system 1010 includes an imaging table 1020 and the mobile terminal 120. The difference from FIG. 2 is that in the case of the second embodiment, the imaging table 1020 has an imaging device 1021 and is connected to the mobile terminal 120.

Thus, even if the imaging device 1021 is arranged on the imaging table 1020 and the mobile terminal 120 functions as an identifying unit and an output unit, the same effect as in the first embodiment can be obtained.

In the present embodiment, the imaging device 1021 is arranged on the imaging table 1020, but other functions implemented in the mobile terminal 120 may be arranged on the imaging table 1020. That is, in the inspection system 1010 including the imaging table 1020 and the mobile terminal 120, any combination of function sharing between the imaging table 1020 and the mobile terminal 120 may be implemented.

Third Embodiment

In the first and second embodiment described above, at least the type and the number of environmental microorganisms and image data are output as examples of the providing inspection results, but the method of providing inspection results is not limited to this and may be summarized in a form that is easy for the user to understand, for example, as a report.

Figure 12:
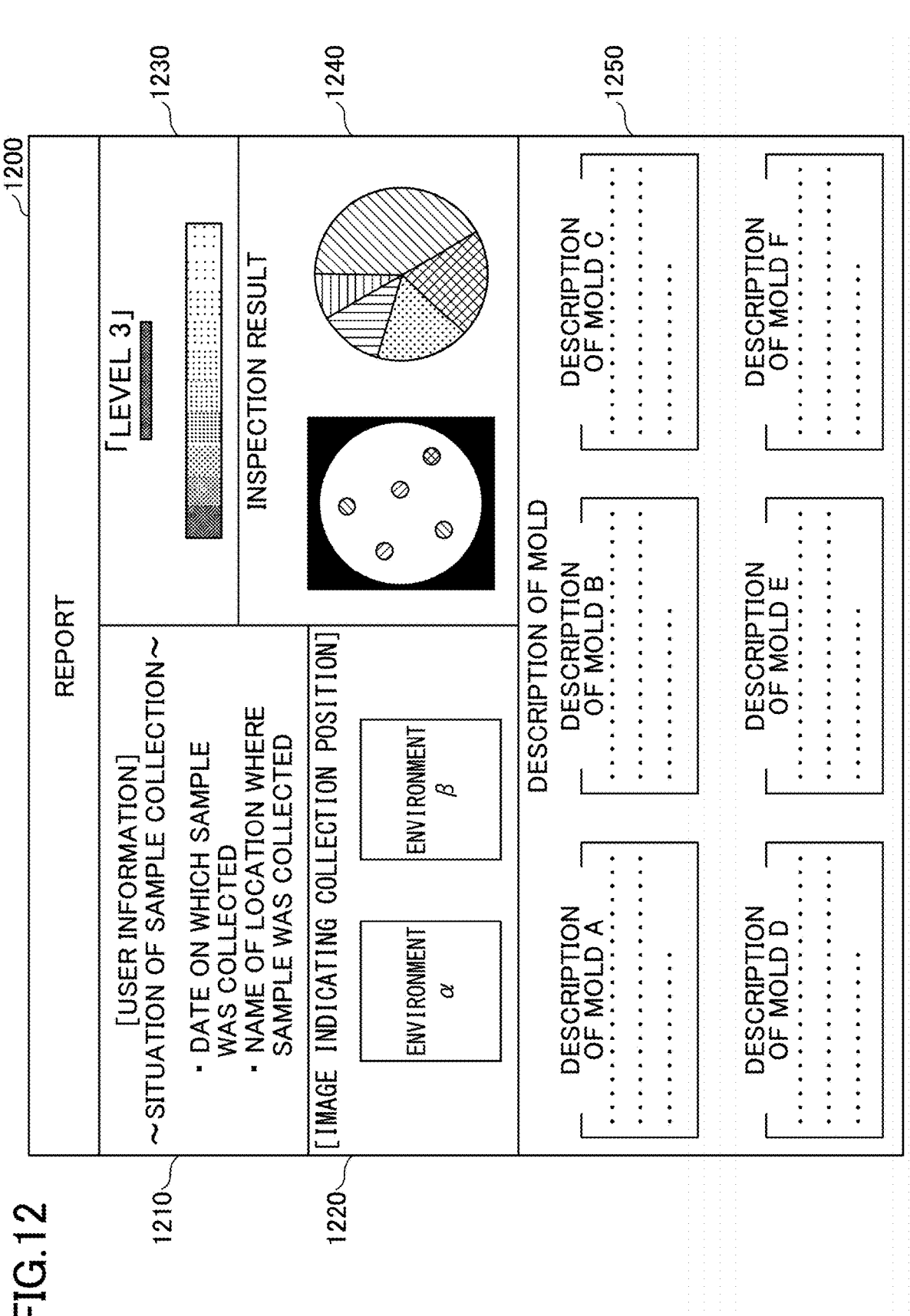
FIG. 12 is a diagram illustrating an example of a report including inspection results.

FIG. 12 illustrates an example of a report including inspection results. As illustrated in FIG. 12, a report 1200 includes, for example, the following information items.

"user information" (reference numeral 1210)
"image indicating the collection position" (reference numeral 1220)
"level" (reference numeral 1230)
"inspection result" (reference numeral 1240)
"description of mold" (reference numeral 1250)

Among these, "user information" includes the date of collection, the name of the place where the sample was collected, etc., as the situation in which the sample was collected. Further, "image indicating the collection position" includes an image indicating the location of collection, etc., as information indicating the environment in which the sample was collected. Further, "level" indicates the level of contamination calculated based on the inspection result. Further, in the "inspection result", a graph or the like illustrating the captured image data, the type and number (or ratio) of mold detected is inserted. Furthermore, in the "description of mold", a detailed description of each type of mold (in the example in FIG. 12, mold A to mold F) is included.

Note that although not illustrated in the report 1200 in FIG. 12, the report 1200 may further include comparison results with past inspection results. Past inspection results referred to here include past inspection results of the same location and/or past inspection results of different collection positions.

Fourth Embodiment

Although the first embodiment did not specifically describe the size of the image data (partial image data) of each region determined to include environmental microorganisms, the size of the image data of each region is, for example, 32×32 pixels or more or 50×50 pixels or more.

Further, although the case of collecting dust from an air conditioner (indoor unit) was described in the first embodiment, the location from which the dust is collected is not limited to the air conditioner (indoor unit) but may be other devices. Other devices include, for example, an air cleaner, a humidifier, a ventilation system, a blower, etc. Further, the location from which the dust is collected is not limited to a device, but may be, for example, the surface of an object other than a device (walls, desks, indoor equipment, etc.) as long as the location is in an indoor environment. That is, the inspection system according to the first and second embodiments described above is an inspection system for inspecting microorganisms or mold generated in an indoor environment or a device.

Further, in the first embodiment described above, the case of acquiring an imaging target by collecting dust and dissolving the dust into a solution is described, but the method of acquiring an imaging target is not limited to this. For example, the imaging target may be acquired by collecting dirt and dissolving the dirt into a solution. Alternatively, the imaging target may be acquired by acquiring the solution per se. That is, the imaging target may be any solution that can be obtained by sampling from an indoor environment or device.

Further, in the first embodiment described above, the learning process is performed by using the learning data 441 to 446, but the learning data used for the learning process is not limited to the learning data 441 to 446. The accuracy of identifying environmental microorganisms may be further improved by generating additional learning data and performing the learning process again.

Further, in the first embodiment described above, six types of environmental microorganisms are described, but the types of environmental microorganisms are not limited to six types. Image data may be added to generate learning data corresponding to seven or more environmental microorganisms. In the first embodiment, six types of learning data were generated based on the number of types of environmental microorganisms. However, in determining the types of environmental microorganisms, the system uses data manipulation language (DML), so that even if environmental microorganisms other than the six types are included, environmental microorganisms other than the six types can be accurately classified. Alternatively, even if substances other than environmental microorganisms are included, such substances can be accurately classified. That is, in the case of DML, even if unlearned substances are included, such substances can be accurately classified.

Further, in the first embodiment above, mold is mentioned as an example of environmental microorganisms, but environmental microorganisms are not limited to mold. For example, microorganisms such as bacteria may be used. Here, bacteria include, for example, *legionella* genus, *bacillus, micrococcus*, etc.

Further, in the first embodiment described above, a saline solution including a surfactant is used when the collected sample is dissolved. However, the solution used when the collected sample is dissolved is not limited to this, and further, a solution diluted with a saline solution in which a surfactant is dissolved may be used. That is, the solution used when the collected sample is dissolved includes the following.

a first solution obtained by dispersing the collected sample into a saline solution including dissolved surfactants, and a second solution obtained by further diluting the first solution with a saline solution including dissolved surfactants.

The reason for diluting the solution with a saline solution in which surfactants are dissolved, is because detection accuracy can be improved by diluting the solution. The dilution ratio at this time is, for example, approximately 1 to 1000 times, preferably approximately 5 to 20 times.

In the first embodiment above, the output unit 650 is described as aggregating the number (or percentage) of each type of environmental microorganism in the image data 660. However, the number of each type of environmental microorganism may be counted, for example, by a DML that has completed learning.

As described above, it will be understood that various changes in form and details are possible without departing from the purpose and scope of the claims.

The present application is based upon and claims priority to Japanese Patent Application No. 2021-047960 filed on Mar. 22, 2021, and Japanese Patent Application No. 2021-161942 filed on Sep. 30, 2021, the entire contents of which are incorporated herein by reference.

REFERENCE SIGNS LIST

100: inspection service providing system
120: mobile terminal
121: imaging device
130: imaging table
132: mounting part
133: lens support part
140: image processing apparatus
150: air conditioner (indoor unit)
160: dust
180_1 to 180_6: preparation
210: air conditioner (indoor unit)
220: dust
240: preparation
410: image data acquiring unit
420: correct label acquiring unit
430: learning data generating unit

441 to 446: learning data
510: first learning unit
520: second learning unit
610: image data acquiring unit
620: first inference unit
630: partial image extracting unit
640: second inference unit
650: output unit
720: aggregated data
1010: inspection system
1020: imaging table
1021: imaging device
1200: report

The invention claimed is:

1. An inspection system for inspecting a microorganism or mold that is generated in an indoor environment or a device, the inspection system comprising:

an imaging unit configured to directly capture a sample collected from the indoor environment or the device; and an output unit configured to inspect the microorganism or the mold in image data captured by the imaging unit, and output an inspection result, wherein the imaging unit is configured to capture an imaging target, the imaging target being a solution collected from the indoor environment or the device, the solution being obtained by dissolving, in the solution, the sample collected from the indoor environment or the device, and the imaging target obtained without culturing the microorganism or the mold in the sample.

2. The inspection system according to claim 1, wherein the imaging unit captures the sample to capture an appearance of an individual unit of the microorganism or the mold included in the sample.

3. The inspection system according to claim 2, wherein the output unit displays, as the inspection result, a type of the microorganism or the mold, a ratio of the microorganism or the mold, and the image data captured by the imaging unit, and also displays any one of information indicating the indoor environment or the device, a description of the microorganism or the mold, a level of contamination, and a result of comparison with another inspection result.

4. The inspection system according to claim 1, wherein the imaging unit captures the imaging target through a lens under visible light or ultraviolet light.

5. The inspection system according to claim 1, wherein the imaging target is collected from any of an air conditioner, an air cleaner, a humidifier, a ventilation system, a blower, or a surface of the indoor environment.

6. The inspection system according to claim 1, further comprising:

a first model that has completed learning configured to determine an attribute of each region in the image data.

7. The inspection system according to claim 6, further comprising:

a second model that has completed learning configured to determine a type of the microorganism or the mold, with respect to the region determined to include the microorganism or the mold by the first model that has completed learning.

8. The inspection system according to claim 7, wherein each of the regions, for which the attribute is determined by the first model that has completed learning, is 32 pixels×32 pixels or more.

9. The inspection system according to claim 7, wherein the first model that has completed learning is generated by performing learning processing by using learning data, wherein in the learning data, the image data including a same type of the microorganism or the mold, and position information in which a position of each of the regions determined to include the microorganism or the mold in the image data is identified by a plurality of coordinates, are associated with each other.

10. The inspection system according to claim 7, wherein when the type of the microorganism or the mold is determined, the second model that has completed learning counts a number of the microorganism or the mold for each determined type.

11. The inspection system according to claim 7, further comprising:

a portable imaging table on which the imaging target is mounted, and a mobile terminal connected to the imaging table, wherein the imaging table includes the imaging unit, and the mobile terminal includes the first model that has completed learning, the second model that has completed learning, and the output unit.

12. The inspection system according to claim 7, wherein the first model that has completed learning is a YOLO that has completed learning.

13. The inspection system according to claim 7, wherein the second model that has completed learning is generated by performing learning processing by using learning data, wherein in the learning data, partial image data of each of the regions determined to include the microorganism or the mold in the image data including a same type of the microorganism or the mold, and the type of the microorganism or the mold, are associated with each other.

14. The inspection system according to claim 7, wherein the second model that has completed learning is a DML that has completed learning.

15. The inspection system according to claim 1, wherein the output unit aggregates a number of the microorganism or the mold for each type of the microorganism or the mold in the image data captured by the imaging unit, and outputs the aggregated number.

16. The inspection system according to claim 1, wherein the imaging target is obtained by dispersing and dissolving the collected sample in the solution.

17. The inspection system according to claim 16, wherein the imaging target is obtained by dispersing and dissolving, in the solution, the sample collected from an air conditioner.

18. The inspection system according to claim 16, wherein the imaging target is obtained by dispersing and dissolving the collected sample in a saline solution in which a surfactant is dissolved.

19. The inspection system according to claim 16, wherein the imaging target includes a first solution obtained by dispersing and dissolving the collected sample in a saline solution in which a surfactant is dissolved, and a second solution obtained by further diluting the first solution by using a saline solution in which a surfactant is dissolved.

20. The inspection system according to claim 1, wherein the inspection system is a mobile terminal, and the imaging unit is built in the mobile terminal.

21. An inspection method performed by an inspection system for inspecting a microorganism or mold that is generated in an indoor environment or a device, the inspection method comprising:

an imaging step of directly capturing a sample collected from the indoor environment or the device; and an output step of inspecting the microorganism or the mold in captured image data, and outputting an inspection result, wherein an imaging target captured during the imaging step is a solution collected from the indoor environment or the device, the solution being obtained by dissolving, in the solution, the sample collected from the indoor environment or the device, and the imaging target obtained without culturing the microorganism or the mold in the sample.

22. The inspection method according to claim 21, wherein the imaging step includes capturing the sample to capture an appearance of an individual unit of the microorganism or the mold included in the sample.

* * * * *